US009672785B2

(12) United States Patent
An et al.

(10) Patent No.: US 9,672,785 B2
(45) Date of Patent: Jun. 6, 2017

(54) DUAL DATA DRIVING MODE LIQUID CRYSTAL DISPLAY

(71) Applicant: LG DISPLAY CO., LTD., Seoul (KR)

(72) Inventors: ChungHwan An, Seoul (KR); JoonHa Park, Goyang-si (KR); JaeWoo Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/824,441

(22) Filed: Aug. 12, 2015

(65) Prior Publication Data

US 2016/0049130 A1 Feb. 18, 2016

(30) Foreign Application Priority Data

Aug. 18, 2014 (KR) ........................ 10-2014-0107210

(51) Int. Cl.
*G06F 3/038* (2013.01)
*G09G 3/36* (2006.01)

(52) U.S. Cl.
CPC ......... *G09G 3/3688* (2013.01); *G09G 3/3614* (2013.01); *G09G 2310/0248* (2013.01); *G09G 2310/08* (2013.01); *G09G 2320/0223* (2013.01)

(58) Field of Classification Search
CPC ............... G09G 3/3688; G09G 3/3614; G09G 2310/0248; G09G 2320/0223; G09G 2310/08
See application file for complete search history.

(56) References Cited

U.S. PATENT DOCUMENTS

| | | | | |
|---|---|---|---|---|
| 8,743,107 | B2 * | 6/2014 | Kim | G09G 3/20 345/204 |
| 2002/0075214 | A1 | 6/2002 | Kim | |
| 2002/0180684 | A1 | 12/2002 | Saitou et al. | |
| 2003/0038771 | A1 | 2/2003 | Sunohara | |
| 2003/0161189 | A1 | 8/2003 | Park | |
| 2004/0012553 | A1 | 1/2004 | Lee et al. | |
| 2005/0219189 | A1 | 10/2005 | Fukuo | |
| 2007/0115243 | A1 | 5/2007 | Kim et al. | |
| 2011/0032247 | A1 * | 2/2011 | Hsieh | G09G 3/20 345/214 |
| 2011/0069049 | A1 * | 3/2011 | Wong | G09G 3/3216 345/205 |
| 2013/0257842 | A1 * | 10/2013 | Igawa | G09G 5/001 345/212 |

(Continued)

*Primary Examiner* — Rodney Amadiz
(74) *Attorney, Agent, or Firm* — Dentons US LLP

(57) ABSTRACT

Disclosed is a display device having a display panel in which a plurality of gate lines and a plurality of data lines cross each other to define a plurality of pixels that may include a timing control unit that outputs a first data control signal and an image data; a first data driving unit on a first side of the display panel that generates a first data signal from the image data according to the first data control signal, outputs the first data signal to one of the plurality of data lines from the first side, and generates a second data control signal from the first data control signal; and a second data driving unit on a second side of the display panel that generates a second data signal from the first data signal according to the second data control signal, the second data signal substantially synchronized with the first data signal, and outputs the second data signal to the one of the plurality of data lines from the second side.

9 Claims, 6 Drawing Sheets

(56) References Cited

U.S. PATENT DOCUMENTS

2015/0310824 A1* 10/2015 Yang .................... G09G 5/006
345/213
2016/0148599 A1* 5/2016 Lim ........................ G09G 3/20
345/212

* cited by examiner

DUAL DATA DRIVING MODE LIQUID CRYSTAL DISPLAY

CROSS REFERENCE TO RELATED APPLICATIONS

This application claims the benefit of the Korean Patent Application No. 10-2014-0107210, filed on Aug. 18, 2014, which is hereby incorporated by reference in its entirety for all purposes as if fully set forth herein.

BACKGROUND OF THE INVENTION

Field of the Invention

The present disclosure relates to a display device and a method for driving the same, and more particularly, to a dual data driving mode liquid crystal display including a plurality of data driving units.

Discussion of the Related Art

Recently, display devices that are slim and lightweight and have a large-sized screen are in demand for personal computers and televisions. In order to meet such demand, flat panel displays such as liquid crystal displays (LCDs) have been developed and commercialized in various fields such as display devices for computers and televisions in place of cathode-ray tubes (CRTs).

An LCD includes a substrate on which a pixel pattern is formed in a matrix form, a counter substrate, and a liquid crystal material having dielectric anisotropy provided between the substrates. An electric field is applied to between the two substrates, and an amount of light passing through the liquid crystal material is controlled by adjusting strength of the electric field, thus displaying a desired image.

Meanwhile, as the screen size and the resolution of LCDs are being increased, a dual data driving mode has been adopted in which data driving units for driving image data are divided into two groups and disposed, for example, above and below the liquid crystal panel.

FIG. 1 is a circuit diagram illustrating a dual data driving mode LCD according to the related art.

Referring to FIG. 1, the LCD 10 includes a liquid crystal panel 1 and driving circuits for driving the liquid crystal panel 1. The driving circuits include a first timing control unit 5, a second timing control unit 6, a gate driving unit 2, a first data driving unit 3, and a second data driving unit 4.

In the liquid crystal panel 1, a plurality of gate lines GL and a plurality of data lines DL are formed to cross each other to define a plurality of pixels. A thin film transistor (TFT), a liquid crystal capacitor Clc, and a storage capacitor Cst are formed in each of the pixel regions.

The first timing control unit 5 and the second timing control unit 6 generate a first gate control signal GCS1, a second gate control signal GCS2, a first data control signal DCS1, a second data control signal DCS2, and image data RGB' from a control signal CNT and an image signal RGB provided from an external system (not shown), and output the generated signals and data.

The gate driving unit 2 generates a gate signal according to the first gate control signal GCS1 provided from the first timing control unit 5 and the second gate control signal GCS2 provided from the second timing control unit 6. The gate signal is sequentially output to the plurality of gate lines GL of the liquid crystal panel 1.

The first data driving unit 3 and the second data driving unit 4 are positioned at two sides of the plurality of data lines DL of the liquid crystal panel 1 in a corresponding manner.

The first data driving unit 3 generates a first data signal according to the first data control signal DCS1 and the image data RGB' provided from the first timing control unit 5. The first data signal is output to one side of the plurality of data lines DL of the liquid crystal panel 1. The second data driving unit 4 generates a second data signal according to the second data control signal DCS2 and the image data RGB' provided from the second timing control unit 6. The second data signal is output to the other side of the plurality of data lines DL of the liquid crystal panel 1.

As described above, the dual data driving mode LCD 10 according to the related art includes a plurality of data driving units, namely, the first data driving unit 3 and the second data driving unit 4 above and below the liquid crystal panel. Here, the first data driving unit 3 and the second data driving unit 4 have the same configuration.

Also, circuit boards for mounting peripheral circuits, for example, the first timing control unit 5 and the second timing control unit 6 are disposed above and below the liquid crystal panel and connected to the first data driving unit 3 and the second data driving unit 4, respectively, in order to provide control signals and image data to the first data driving unit 3 and the second data driving unit 4.

In the related art dual data driving mode LCD 10, the first data driving unit 3 and the second data driving unit 4, which have the same configuration, and the two timing control units 5 and 6, which control the first and second data driving units 3 and 4, are mounted on the circuit boards, which increases the manufacturing cost of the LCD 10.

In addition, an additional control circuit board may be required to control and synchronize the control signals output from the first timing control unit 5 and the second timing control unit 6 mounted on the circuit boards, which may further increase the manufacturing cost.

SUMMARY OF THE INVENTION

Accordingly, the present invention is directed to a display device and method for driving the same that substantially obviates one or more of the problems due to limitations and disadvantages of the related art.

An advantage of the present invention is to provide to provide a display device with improved display quality and/or simplified configuration.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device having a display panel in which a plurality of gate lines and a plurality of data lines cross each other to define a plurality of pixels, may, for example, include a timing control unit that outputs a first data control signal and an image data; a first data driving unit on a first side of the display panel that generates a first data signal from the image data according to the first data control signal, outputs the first data signal to one of the plurality of data lines from the first side, and generates a second data control signal from the first data control signal; and a second data driving unit on a second side of the display panel that generates a second data signal from the first data signal according to the second data control signal, the second data signal substantially synchronized with the first data signal, and outputs the second data signal to the one of the plurality of data lines from the second side.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments of the present invention, examples of which are illustrated in the accompanying drawings. For the sake of brief description with reference to the drawings, the same or equivalent components will be provided with the same reference numbers, and description thereof will not be repeated.

Hereinafter a liquid crystal display (LCD) device according to an embodiment of the present invention will be described with reference to the accompanying drawings.

Figure 1:
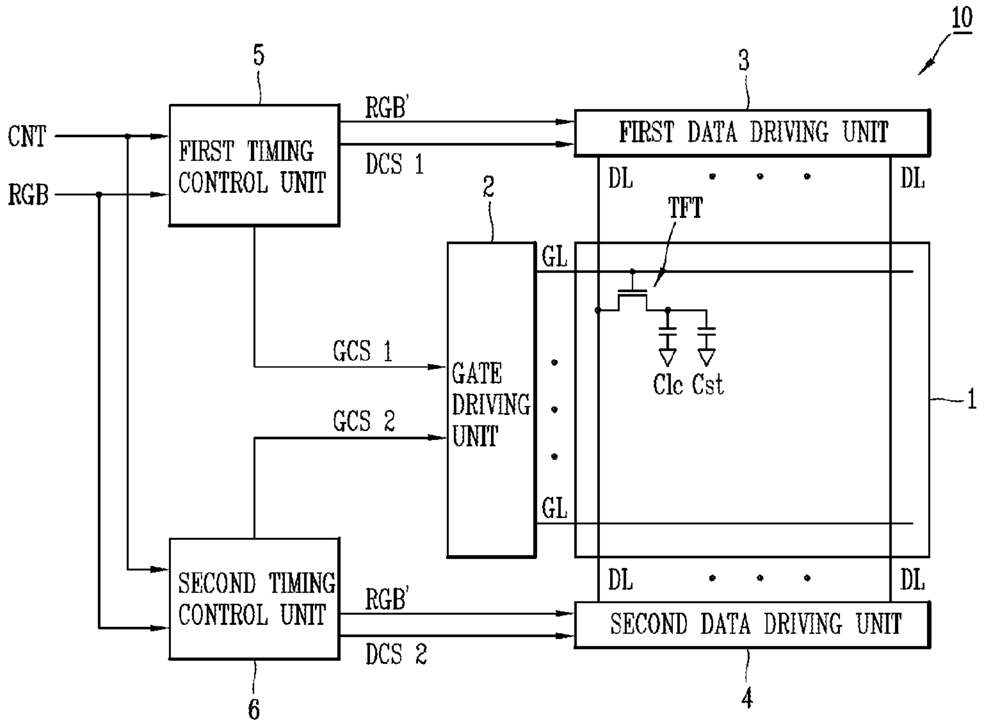
FIG. 1 RELATED ART
FIG. 1 is a circuit diagram illustrating a dual data driving mode liquid crystal display (LCD) device according to the related art.
Figure 2:
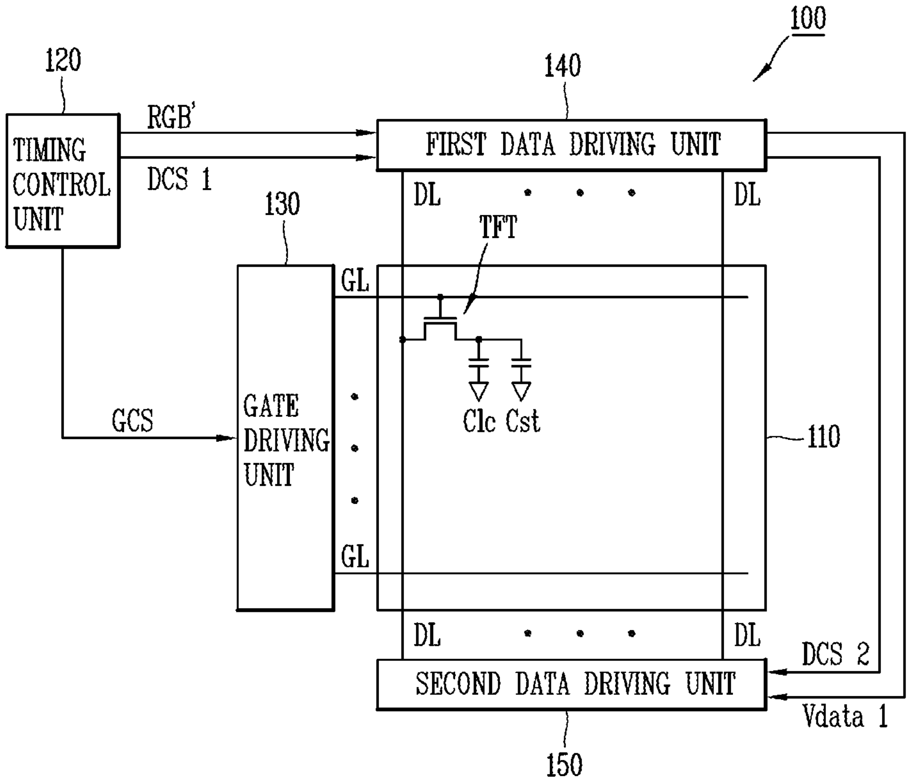
FIG. 2 is a circuit diagram illustrating a dual data driving mode LCD according to an embodiment of the present invention.

FIG. 2 is a circuit diagram illustrating a dual data driving mode LCD according to an embodiment of the present invention.

Referring to FIG. 2, a dual data driving mode LCD device 100 includes a liquid crystal panel 110 and driving circuits for driving the liquid crystal panel 110. The driving circuits include a timing control unit 120, a gate driving unit 130, a first data driving unit 140, and a second data driving unit 150.

The liquid crystal panel 110 may include a plurality of gate lines GL, a plurality of data lines DL, and a plurality of pixels defined by the crossings of the plurality of gate lines GL and the plurality of data lines DL. Each of the pixels may include a thin film transistor (TFT), a liquid crystal capacitor Clc, and a storage capacitor Cst.

In the liquid crystal panel 110, when a gate signal is provided to the plurality of gate lines GL (to be described hereinafter), the TFT connected to the gate line GL is turned on, and accordingly, a data signal provided from the first data driving unit 140 and the second driving unit 150 to the plurality of data lines DL is applied to the liquid crystal capacitor Clc and the storage capacitor Cst through the TFT of a corresponding pixel, which enables an image to be displayed on the liquid crystal panel 100.

Meanwhile, when the liquid crystal panel 110 has a large area, a data signal can be attenuated due to a relatively resistance caused by a length of the data line DL, thereby leading to data distortion. The LCD device 100 has thus two or more data driving units, that is, a first data driving unit 140 and a second data driving unit 150 provided on both sides of the liquid crystal panel 110 in a corresponding manner. The first data driving unit 140 and the second data driving unit 150 can simultaneously output synchronized data signals from both sides of the data lines DL, respectively, which may reduce or prevent the data signals from being attenuated or distorted. The first data driving unit 140 and the second data driving unit 150 will be described in more detail.

The timing control unit 160 may generate a gate control signal CGS and a data control signal, for example, a first data control signal DCS1, from a control signal provided from an external system (not shown). The gate control signal GCS may be output from the gate driving unit 130, and a first data control signal DCS1 may be output from the data driving unit, for example, the first data driving unit 140.

The gate control signal GCS may include a gate start pulse GSP, a gate shift clock GSC, and an output enable signal GOE. The first data control signal DCS1 may include a source start pulse SSP, a source sampling clock (SSC), an output enable signal SOE, and a polarity control signal POL.

Also, the timing control unit 160 may process an image signal provided from an external system according to a resolution of the liquid crystal panel 110 to generate realigned image data RGB'. The image data RGB' may be output to the first data driving unit 140 together with the first data control signal DCS1.

The gate driving unit 130 may generate a gate signal according to the gate control signal GCS provided from the timing control unit 160. The gate signal may be sequentially output to the plurality of gate lines GL of the liquid crystal panel 110.

The first data driving unit 140 may generate a data signal, for example, a first data signal Vdata1, having either a positive or negative polarity from the image data RGB' according to the first data control signal DCS1 provided from the timing control unit 160. The first data signal Vdata1 may be output to one side of the plurality of data lines DL of the liquid crystal panel 110 from the first data driving unit 140.

Also, the first data driving unit 140 may generate a control signal, for example, a second data control signal DCS2, for controlling an operation of the second data driving unit 150 as described hereinafter. The second data control signal DCS2 may be generated from the first data control signal DCS1. The second data control signal DCS2 may include a polarity control signal POL, a select signal SEL, and a charge control signal PCTL. Here, the polarity control signal POL included in the second data control signal DCS2 may be the same signal as the polarity control signal POL included in the first data control signal DCS1.

Meanwhile, in this embodiment, the first data driving unit 140 generates the second data control signal as an example. However, the present invention is not limited thereto, and the timing control unit 160 may generate both the first data control signal DCS1 and the second data control signal DCS2, and output the second data control signal DCS2 to the second data driving unit 150 through the first data driving unit 140.

The second data driving unit 150 may generate a second data control signal from the second data control signal DCS2 and the first data signal Vdata1 provided from the first data driving unit 140. The second data signal may be output to the other side of the plurality of data lines DL of the liquid crystal panel 110 from the second data driving unit 150, as illustrated in FIG. 3.

Here, the second data signal is synchronized with the first data signal Vdata1 such that output timing coincides. To this end, the second data driving unit 150 may control synchronization of the first data signal Vdata1 and the second data signal by using the polarity control signal POL included in the second data control signal DCS2.

In the LCD device 100, the second data driving unit 150 serves to output the second data signal synchronized with the first data signal Vdata1 output from the first data driving unit 140. Thus, the second data driving unit 150 may have a simple configuration as compared with the first data driving unit 140. For example, the first data driving unit 140 may include components such as a plurality of latches, a digital-to-analog converter (DAC), and a plurality of buffers, but these components may be omitted in the second data driving unit 150. Thus, the manufacturing cost may be reduced as compared with the LCD device according to the related art.

Figure 3:
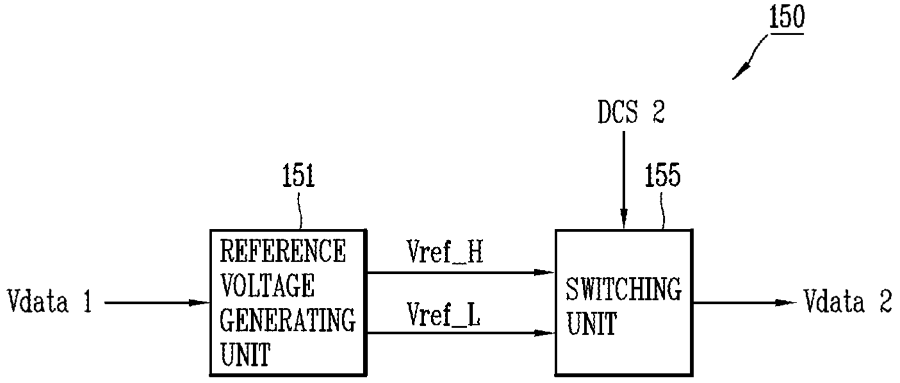
FIG. 3 is a circuit diagram illustrating a configuration of a second data driving unit of FIG. 2.

FIG. 3 is a circuit diagram illustrating a configuration of the second data driving unit of FIG. 2.

Referring to FIGS. 2 and 3, the second data driving unit 150 may include a reference voltage generating unit 151 and a switching unit 155.

The reference voltage generating unit 151 may generate a plurality of reference voltages, for example, a first reference voltage Vref_H and a second reference voltage Vref_L, having different magnitudes, from the first data signal Vdata1 provided from the first data driving unit 140, and output the generated reference voltages.

The first reference voltage Vref_H may be generated to have a magnitude of ¾ of a maximum value of the first data signal Vdata1. The second reference voltage Vref_L may be generated to have a magnitude of ¼ of the maximum value of the first data signal Vdata1.

The switching unit 155 may select one of the two reference voltages, namely, the first reference voltage Vref_H and the second reference voltage Vref_L, provided form the reference voltage generating unit 151 according to the second data control signal DCS2, and output the selected voltage as a second data signal Vdata2. The switching unit 155 may be configured as a push pull switch type.

As described above, a polarity control signal may be included in the second data control signal DCS2. The switching unit 155 may alternately output the first reference voltage Vref_H and the second reference voltage Vref_L as the second data signal Vdata2 during 1 period of the polarity control signal POL.

For example, the switching unit 155 may output the first reference voltage Vref_H as the second data signal Vdata2 during a first section of the polarity control signal POL. Also, the switching unit 155 may output the second reference voltage Vref_L as the second data signal during a second section of the polarity control signal POL. Here, one section may refer to a section in which the polarity control signal POL has a first level, for example, a high level, and the second section may refer to a section in which the polarity control signal POL has a second level different from the first level, for example, a low level.

Meanwhile, since the polarity control signal POL of the second data control signal is the same as the polarity control signal POL of the first data control signal DCS1, the second data signal Vdata2 output from the switching unit 155 may be synchronized with the first data signal Vdata1 output from the first data driving unit 140.

For example, when a first data signal Vdata1 having a first level is output from the first data driving unit 140 during the first section of the polarity control signal POL, the switching unit 155 may output a second data signal Vdata2 having a first level. Also, when a first data signal Vdata1 having a second level is output from the first data driving unit 140 during the second section of the polarity control signal POL, the switching unit 155 may output a second data signal Vdata2 having a second level. That is, the second data driving unit 150 may be synchronized with the first data driving unit 140 by the polarity control signal POL.

Figure 4:
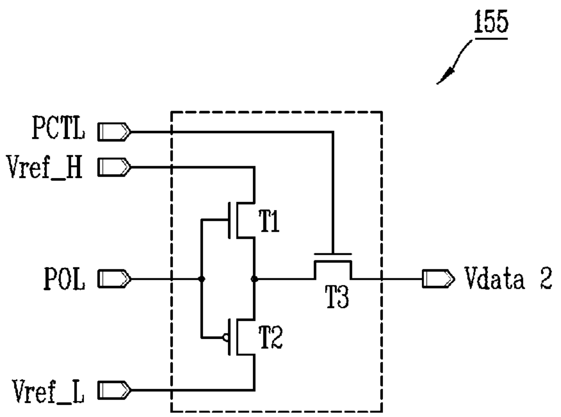
FIG. 4 is a circuit diagram illustrating a configuration of a switching unit of FIG. 3.
Figure 5:
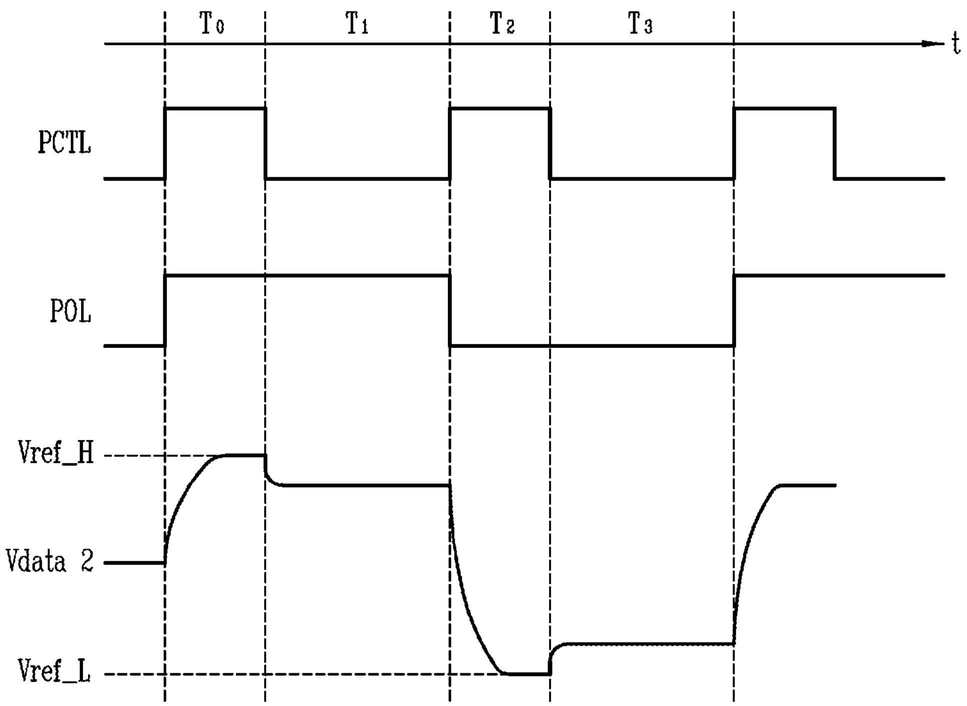
FIG. 5 is a timing diagram illustrating an operation of the switching unit.

FIG. 4 is a circuit illustrating a configuration of a switching unit of FIG. 3, and FIG. 5 is a timing diagram illustrating an operation of the switching unit.

Referring to FIG. 4, the switching unit 155 may output one of the first reference voltage Vref_H and the second reference voltage Vref_L output from the reference voltage generating unit 151 as the second data signal Vdata2 by the polarity control signal POL and a charge control signal PCTL included in the second data control signal DCS2.

To this end, the switching unit 155 may include three switching elements, for example, a first switching transistor T1, a second switching transistor T2, and a third switching transistor T3.

The first switching transistor T1 and the second switching transistor T2 may be operated by the polarity control signal POL. For example, the first switching transistor T1 may be turned on during the first section of the polarity control signal POL to output the first reference voltage Vref_H. Also, the second switching transistor T2 may be turned on during the second section of the polarity control signal POL to output the second reference voltage Vref_L. That is, the first switching transistor T1 and the second switching transistor T2 may be alternately turned on during 1 period of the polarity control signal POL to output the first reference voltage Vref_H and the second reference voltage Vref_L, respectively.

The third switching transistor T3 may be operated by the charge control signal PCTL. For example, the third switching transistor T3 may be turned on by the charge control signal PCTL having a first level to output one of the first reference voltage Vref_H and the second reference voltage Vref_L output from the first switching transistor T1 or the second switching transistor T2 as a second data signal Vdata2. Here, the charge control signal PCTL having the first level may be output during each of the first section and the second section of the polarity control signal POL once.

Referring to FIGS. 4 and 5, during a time duration T0 of the time axis (t), the first switching transistor T1 of the switching unit 155 is turned on by the polarity control signal POL having a first level to output the first reference voltage Vref_H. Also, the third switching transistor T3 may be turned on by the charge control signal PCTL having a first level during the first section of the polarity control signal POL to output the first reference voltage Vref_H as the second data signal Vdata2. The second data signal Vdata2 may be synchronized with the first data signal Vdata1 and output to the other side of the data lines DL. Here, the first level may refer to a high level.

Subsequently, during a time duration T1, the third switching transistor T3 of the switching unit 155 may be turned off by the charge control signal PCTL having a second level, and thus, the second data signal Vdata2 is not output. Thus, the second data signal Vdata2, which has been output to the other side of the data lines DL, may be held, while maintaining a predetermined level. Here, since the polarity control signal POL has the first level, the first data signal Vdata1 output from the first data driving unit 140 may have the first level, and accordingly, the second data signal Vdata2 may also be held, while maintaining the first level.

Thereafter, during a time duration T2, the second switching transistor T2 of the switching unit 155 may be turned on by the polarity control signal POL having the second level to output the second reference voltage Vref_L. Also, the third switching transistor T3 may be turned on by the charge control signal PCTL having a first level during the second section of the polarity control signal POL to output the second reference voltage Vref_L as the second data signal Vdata2. The second data Vdata2 may be synchronized with the first data signal Vdata1 and output to the other side of the data lines DL. Here, the second level may refer to a low level.

Also, during a time duration T3, the third switching transistor T3 of the switching unit 155 may be turned off by the charge control signal PCTL having the second level, and thus, the second data signal Vdata2 may not be output. Accordingly, the second data signal Vdata2, which has been output to the other side of the data lines DL, may be held, while maintaining a predetermined level. Here, since the polarity control signal POL has the second level, the first data signal Vdata1 output from the first data driving unit 140 may have the second level, and accordingly, the second data signal Vdata2 may also be held, while maintaining the second level.

In this manner, the second driving unit 150 according to the present embodiment may select one of the plurality of reference voltages generated from the first data signal Vdata1, according to the second data control signal DCS2, and output the selected reference voltage as the second data signal Vdata2 to the other side of the data lines DL of the liquid crystal panel 110. Here, the second data signal Vdata2 may be synchronized with the first data signal Vdata1 according to the polarity control signal POL and output.

Thus, in the LCD device 100, since the first data signal Vdata1 output to one side of the data lines DL of the liquid crystal panel 110 from the first data driving unit 140, which may be attenuated when transferred to the end of the liquid crystal panel 100, for example, to the other side of the data lines DL, can be compensated by outputting the second data signal Vdata2 synchronized with the first data signal Vdata1, thereby reducing or preventing data distortion.

Also, since the second data driving unit 15 of the LCD device 100 generates the second data signal Vdata2 from the first data signal Vdata1 output from the first data driving unit 140, a configuration of the at least one of the first and second data driving units and its related circuits can be simplified, as compared with the LCD device according to the related art. Thus, the manufacturing cost of the LCD device 100 may be reduced.

Meanwhile, the second data driving unit 150 may output second data signals Vdata2 having various magnitudes according to images displayed on the liquid crystal panel 110. For example, the second data driving unit 150 may vary a magnitude of the second data signal Vdata2 by adjusting a duty ratio of the charge control signal PCTL, and output the same.

Figure 6A:
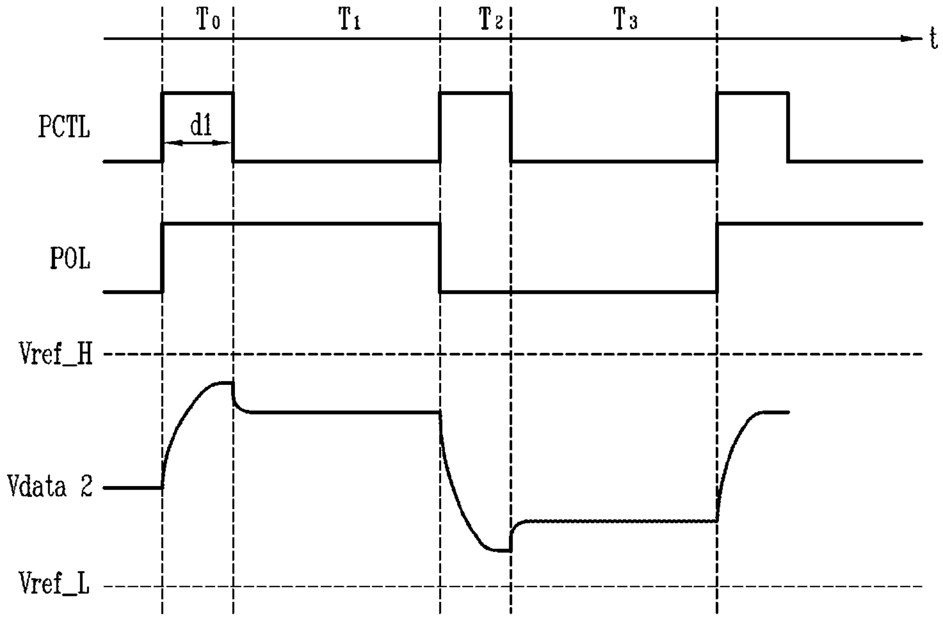
FIGS. 6A through 6C are timing diagrams illustrating varying a level of a second data signal.
Figure 6B:
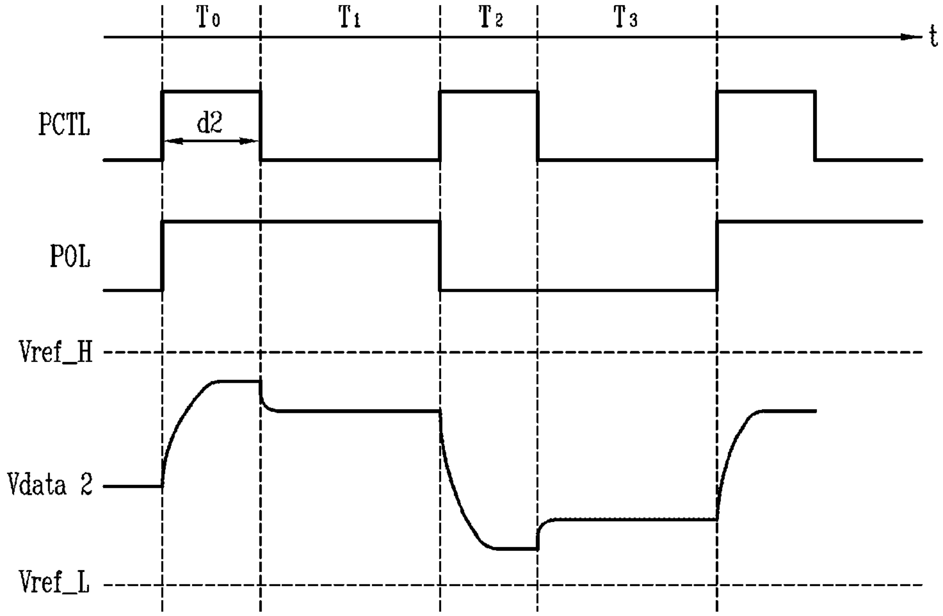
Figure 6C:
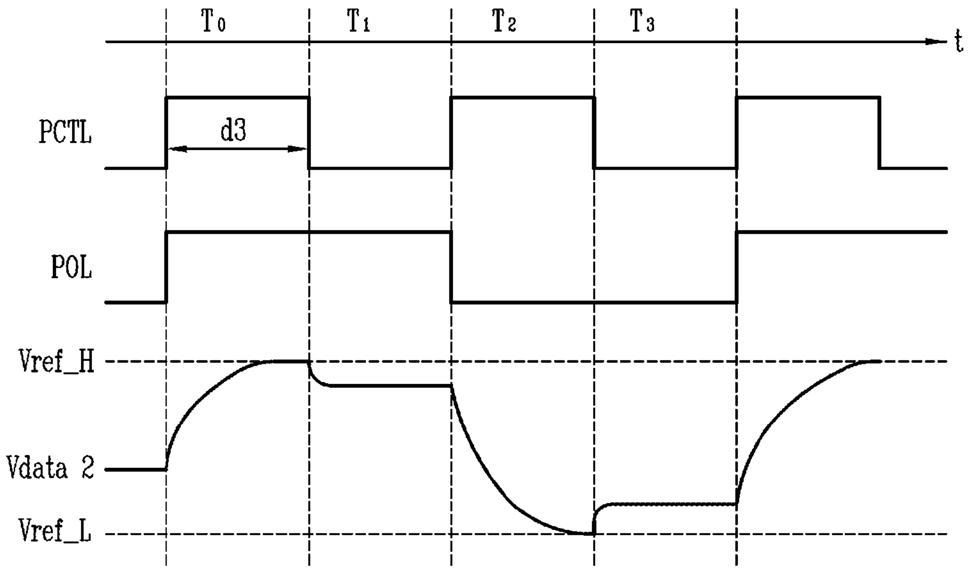

FIGS. 6A through 6C are timing diagrams illustrating varying a level of the second data signal.

Referring to FIGS. 4 and 6A, during a time duration t0 of the time axis (t), the first switching transistor T1 may be turned on by the polarity control signal having the first level to output the first reference voltage Vref_H. The third switching transistor T3 may be turned on during a first section of the charge control signal PCTL to output the first reference voltage Vref_H as a second data signal Vdata2. Here, the first section of the charge control signal PCTL may refer to a section in which the charge control signal PCTL has a first level.

The turn-on time of the third switching transistor T3 may vary depending on a width of the first section of the charge control signal PCTL, namely, a duty ratio of the charge control signal PCTL. FIG. 6A illustrates an example in which the charge control signal PCTL has a duty ratio of 20%, and thus, the first section of the charge control signal PCTL may have a first width d1.

Thus, the third switching transistor T3 is turned on during the first section of the charge control signal PCTL having the first width d1, and since the time is short, the second data signal Vdata2 output from the third switching transistor has a magnitude smaller than that of the first reference voltage Vref_H.

Similarly, during a time duration T2 of the time axis (t), the third switching transistor T3 may be turned on during a first section of the charge control signal PCTL having a first width d1. Also, at this time, since the turn-on time of the third switching transistor T3 is short, the second data signal Vdata2 output from the third switching transistor T3 has a magnitude smaller than that of the second reference voltage Vref_L.

Referring to FIGS. 4 and 6B, during a time duration T0, the first switching transistor T1 is turned on by the polarity control signal POL having the first level to output the first reference voltage Vref_H. The third switching transistor T3 may be turned on during the first section of the charge control signal PCTL to output the first reference voltage Vref_H as the second data signal Vdata2. Here, the first section of the charge control signal PCTL may refer to a section in which the charge control signal PCTL has a first level.

The turn-on time of the third switching transistor T3 may vary depending on a width of the first section of the charge control signal PCTL, namely, a duty ratio of the charge control signal PCTL. FIG. 6B illustrates an example in which the charge control signal PCTL has a duty ratio of 30%, and thus, the first section of the charge control signal PCTL may have a second width d2.

Thus, the third switching transistor T3 is turned on during the first section of the charge control signal PCTL having the second width d2, and since the time is short, the second data signal Vdata2 output from the third switching transistor T3 has a magnitude smaller than that of the first reference signal Vref_H.

Similarly, during a time duration T2 of the time axis (t), the third switching transistor T3 may be turned on during a first section of the charge control signal PCTL having a second width d2. Also, at this time, since the turn-on time of the third switching transistor T3 is short, the second data signal Vdata2 output from the third switching transistor T3 has a magnitude smaller than that of the second reference voltage Vref_L.

Here, the second width d2 of the charge control signal PCTL illustrated in FIG. 6B is greater than the first width d1 of the charge control signal PCTL illustrated in FIG. 6A.

Thus, the second data signal Vdata2 illustrated in FIG. 6B may have a magnitude greater than that of the second data signal Vdata2 illustrated in FIG. 6A.

Referring to FIGS. 4 and 6C, during the time T0 of the time axis (t), the first switching transistor T1 is turned on by the polarity control signal POL having the first level to output the first reference voltage Vref_H. The third switching transistor T3 may be turned on during the first section of the charge control signal PCTL to output the first reference voltage Vref_H as the second data signal Vdata2. Here, the first section of the charge control signal PCTL may refer to a section in which the charge control signal PCTL has a first level.

The turn-on time of the third switching transistor T3 may vary depending on a width of the first section of the charge control signal PCTL, namely, a duty ratio of the charge control signal PCTL. FIG. 6C illustrates an example in which the charge control signal PCTL has a duty ratio of 50%, and thus, the first section of the charge control signal PCTL may have a third width d3.

The third switching transistor T3 is turned on during the first section of the charge control signal PCTL having the third width d3, and since the time is longer than the turn-on time of FIGS. 6A and 6B, the second data signal Vdata2 output from the third switching transistor T3 has a magnitude the same as that of the first reference signal Vref_H.

Similarly, during a time duration T2 of the time axis (t), the third switching transistor T3 may be turned on during a first section of the charge control signal PCTL having a second width d2. Also, at this time, since the turn-on time of the third switching transistor T3 is long, the second data signal Vdata2 output from the third switching transistor T3 has a magnitude the same as that of the second reference voltage Vref_L.

As described above with reference to FIGS. 6A through 6C, the second data driving unit 150 may vary a magnitude of the second data signal Vdata2, while adjusting a width of the first section, namely, a duty ratio, of the charge control signal PCTL, and output the same.

The duty ratio of the charge control signal PCTL may be adjusted according to an image displayed on the liquid crystal panel 110, namely, the first data signal Vdata1. For example, in a case in which an image, whose gray level does not rapidly change during a predetermined period of time, namely, during a few frames, for example, a still image, is displayed on the display panel 110, a variation of the first data signal Vdata1 may be small. Thus, the second data driving unit 150 may reduce or minimize the duty ratio of the charge control signal PCTL to allow the second data signal Vdata1 to have a low level. The duty ratio of the charge control signal PCTL may be adjusted by the first data driving unit 140.

In this manner, since the second data driving unit 150 adjusts the second data signal Vdata2 to have a plurality of levels and output the same, a magnitude of the second data signal Vdata2 may be selectively adjusted with respect to various images. Also, a magnitude of power consumption required when the second driving unit 150 is driven may be reduced.

Figure 7:
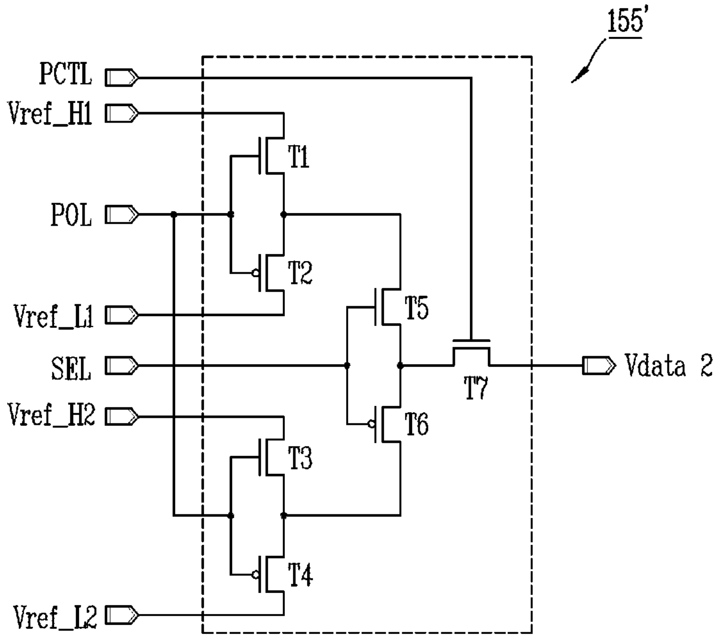
FIG. 7 is a circuit diagram illustrating a configuration of the switching unit illustrated in FIG. 3 according to another embodiment.
Figure 8:
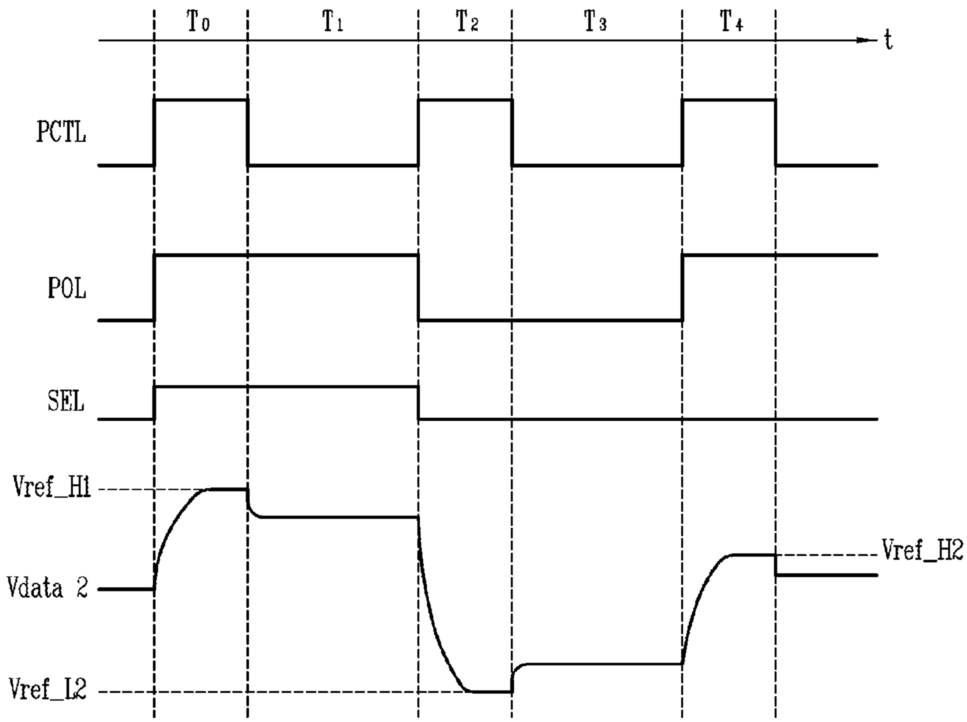
FIG. 8 is a timing diagram illustrating an operation of the switching unit of FIG. 7.

FIG. 7 is a circuit diagram illustrating a configuration of the switching unit illustrated in FIG. 3 according to another embodiment, and FIG. 8 is a timing diagram illustrating an operation of the switching unit of FIG. 7.

Referring to FIG. 7, a switching unit 155' may be operated by the polarity control signal POL, the charge control signal PCTL, and the select signal SEL included in the second data control signal DCS2 to output one of first reference voltage Vref_H1 to fourth reference voltage Vref_L2 as a second data signal Vdata2.

Here, although not shown, a reference voltage generating unit (not shown) for generating the first reference voltage Vref_H1 to the fourth reference voltage Vref_L2 from the first data signal Vdata1 and outputting the same may be beneficially provided.

The first reference voltage Vref_H1 may be generated to have a magnitude of $\frac{5}{6}$ of a maximum value of the first data signal Vdata1, and the second reference voltage Vref_H2 may be generated to have a magnitude of $\frac{2}{6}$ of the maximum value of the first data signal Vdata1. The third reference voltage Vref_L1 may be generated to have a magnitude of $\frac{4}{6}$ of the maximum value of the first data signal Vdata1, and the fourth reference voltage Vref_L2 may be generated to have a magnitude of $\frac{1}{6}$ of the maximum value of the first data signal Vdata1.

The switching unit 155' may combine two of the first reference voltage Vref_H1 to fourth reference voltage Vref_L2 during 1 period of the polarity control signal POL to output the second data signal Vdata2.

To this end, the switching unit 155' may include seven switching elements, for example, first switching transistor T1 to seventh switching transistor T7.

The first switching transistor T1 to fourth switching transistor T4 may be operated according to the polarity control signal POL. For example, the first switching transistor T1 and the third switching transistor T3 may be turned on to output the first reference voltage Vref_H1 and the third reference voltage Vref_L1, respectively, during a first section of the polarity control signal POL. The second switching transistor T2 and the fourth switching transistor T4 may be turned on to output the second reference voltage Vref_H2 and the fourth reference voltage Vref_L2, respectively, during a second section of the polarity control signal POL. Here, the first section of the polarity control signal POL may refer to a section in which the polarity control signal POL has a first level, for example, a high level, and the second section may refer to a section in which the polarity control signal POL has a second level, for example, a low level.

The fifth switching transistor T5 and the sixth switching transistor T6 may be operated by the select signal SEL. For example, the fifth switching transistor T5 may be turned on to output one of the first reference voltage Vref_H1 and the third reference voltage Vref_L1 during a first section of the select signal SEL. The sixth switching transistor may be turned on to output one of the second reference voltage Vref_H2 and the fourth reference voltage Vref_L2 during the second section of the select signal SEL. Here, the first section of the select signal SEL may refer to a section in which the select signal SEL has a first level, and the second section thereof may refer to a section in which the select signal SEL has a second level.

The seventh switching transistor S7 may be operated by the charge control signal PCTL. For example, the seventh switching transistor T7 may be turned on by the charge control signal PCTL having the first level to output one of the first to fourth reference voltages Vref_H1 to Vref_L2 output from the fifth switching transistor T5 and the sixth switching transistor T6 as a second data signal Vdata2. Here, the charge control signal PCTL may be output during each of the first section and the second section of the polarity control signal POL once.

Referring to FIGS. 7 and 8, during a time duration T0 of the time axis (t), the first switching transistor T1 and the third switching transistor T3 of the switching unit 155' are turned on by the polarity control signal POL having a first level to output the first reference voltage Vref_H and the second reference voltage Vref_H2, respectively. Also, the fifth switching transistor T5 may be turned on by the select signal having a first level to output the first reference voltage Vref_H1 which has been output from the first switching transistor T1. The seventh switching transistor Ty may be turned on by the charge control signal PCTL having a first level during the first section of the polarity control signal POL to output the first reference voltage Vref_H, which has been output from the fifth switching transistor T5 as the second data signal Vdata2. The second data signal Vdata2 may be synchronized with the first data signal Vdata1 to output to the other side of the data lines DL. Here, the first level may refer to a high level.

Subsequently, during the time duration T1, the seventh switching transistor T7 may be turned off by the charge control signal PCTL having a second level, and thus, the second data signal Vdata2 is not output. Thus, the second data signal Vdata2, which has been output to the other side of the data lines DL, may be held, while maintaining a predetermined level. Here, since the polarity control signal POL has the first level, the first data signal Vdata1 output from the first data driving unit 140 may have the first level, and accordingly, the second data signal Vdata2 may also be held, while maintaining the first level.

Thereafter, during the time duration T2, the second switching transistor T2 and the fourth switching transistor T4 of the switching unit 155' may be turned on by the polarity control signal POL having the second level to output the third reference voltage Vref_L1 and the fourth reference voltage Vref_L2. Also, the sixth switching transistor T6 may be turned on by the select signal SEL having a second level to output the fourth reference voltage Vref_L2 which has been output from the fourth switching transistor T4. The seventh switching transistor T7 may be turned on by the charge control signal PCTL having a first level during the second section of the polarity control signal POL to output the fourth reference voltage Vref_L2, which has been output from the sixth switching transistor T6 as the second data signal Vdata2. The second data Vdata2 may be synchronized with the first data signal Vdata1 and output to the other side of the data lines DL. Here, the second level may refer to a low level.

Subsequently, during the time duration T3, the seventh switching transistor T7 may be turned off by the charge control signal PCTL having the second level, and thus, the second data signal Vdata2 may not be output. Accordingly, the second data signal Vdata2, which has been output to the other side of the data lines DL, may be held, while maintaining a predetermined level. Here, since the polarity control signal POL has the second level, the first data signal Vdata1 output from the first data driving unit 140 may have the second level, and accordingly, the second data signal Vdata2 may also be held, while maintaining the second level.

Subsequently, during the time duration T4, the first switching transistor T1 and the third switching transistor T4 of the switching unit 155' may be turned on by the polarity control signal POL having the first level to output the first reference voltage Vref_H1 and the second reference voltage Vref_H2, respectively. Also, the sixth switching transistor T6 may be turned on by the select signal SEL having the second level to output the second reference voltage Vref_H2 which has been output from the third switching transistor T3. The seventh switching transistor T7 may be turned on by the charge control signal PCTL having the first level to output the second reference voltage Vref_H2 which has been output from the sixth switching transistor T6 as the second data signal Vdata2. The second data signal Vdata2 may be synchronized with the first data signal Vdata1 and output to the other side of the data lines DL.

In this manner, since the switching unit 155' combines and outputs reference voltages having various magnitudes according to the select signal SEL, the second data signal Vdata2 having various levels may be output without having to adjust a duty ratio of the charge control signal PCTL.

Thus, the second data driving unit 150 may selectively adjust a magnitude of the second data signal Vdata2 and output the same with respect to various images, and thus, the power consumption for driving the second data driving unit 150 may be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device having a display panel in which a plurality of gate lines and a plurality of data lines cross each other to define a plurality of pixels, the display panel comprising:

a timing control unit that outputs a first data control signal and an image data;

a first data driving unit on a first side of the display panel that generates a first data signal from the image data according to the first data control signal, outputs the first data signal to one of the plurality of data lines from the first side, and generates a second data control signal from the first data control signal; and a second data driving unit on a second side of the display panel that generates a second data signal from the first data signal according to the second data control signal, the second data signal substantially synchronized with the first data signal, and outputs the second data signal to the one of the plurality of data lines from the second side, wherein the second data driving unit comprises:

a reference voltage generating unit that generates a first reference voltage and a second reference voltage having different levels from the first data signal; and a switching unit that outputs one of the first reference voltage and the second reference voltage as the second data signal according to the second data control signal.

2. The display device of claim 1, wherein the first reference voltage and the second reference voltage each are generated to have a magnitude smaller than that of the first data signal.

3. The display device of claim 1, wherein the second data control signal includes a polarity control signal, and the switching unit alternately outputs the first reference voltage and the second reference voltage during 1 period of the polarity control signal.

4. The display device of claim 3, wherein the switching unit outputs the second data signal synchronized with the first data signal according to the polarity control signal.

5. The display device of claim 1, wherein the second data control signal includes a polarity control signal and a charge control signal, and the switching unit comprises:

a first switching transistor that is turned on during a first section of the polarity control signal to output the first reference voltage;

a second switching transistor that is turned on during a second section of the polarity control signal to output the second reference voltage; and a third switching transistor that is turned on according to the charge control signal during the first section of the polarity control signal to output the first reference voltage as the second data signal, and that is turned on according to the charge control signal during the second section of the polarity control signal to output the second reference voltage as the second data signal.

6. The display device of claim 1, wherein the second data control signal includes a charge control signal, and the second data driving unit varies a magnitude of the second data signal by adjusting a duty ratio of the charge control signal.

7. The display device of claim 1, wherein the display panel is a liquid crystal display panel.

8. A display device having a display panel in which a plurality of gate lines and a plurality of data lines cross each other to define a plurality of pixels, the display panel comprising:

a timing control unit that outputs a first data control signal and an image data;

a first data driving unit on a first side of the display panel that generates a first data signal from the image data according to the first data control signal, outputs the first data signal to one of the plurality of data lines from the first side, and generates a second data control signal from the first data control signal; and a second data driving unit on a second side of the display panel that generates a second data signal from the first data signal according to the second data control signal, the second data signal substantially synchronized with the first data signal, and outputs the second data signal to the one of the plurality of data lines from the second side, wherein the second data driving unit comprises:

a reference voltage generating unit that generates first to fourth reference voltages having different levels from the first data signal; and a switching unit that combines two of the first to fourth reference voltages according to the second data control signal and outputs the two combined reference voltage as the second data signal.

9. The display device of claim 8, wherein the second data control signal includes a polarity control signal, a select signal, and a charge control signal, and the switching unit comprises:

a first switching transistor and a third switching transistor that are turned on during a first section of the polarity control signal to output the first reference voltage and the third reference voltage, respectively;

a second switching transistor and a fourth switching transistor that are turned on during a second section of the polarity control signal to output the second reference voltage and the fourth reference voltage, respectively;

a fifth switching transistor that is turned on during a first section of the select signal to output one of the first reference voltage and the third reference voltage;

a sixth switching transistor that is turned on during a second section of the select signal to output one of the second reference voltage and the fourth reference voltage; and a seventh switching transistor that is turned on according to the charge control signal during a first section of the polarity control signal to output one of the first reference voltage and the third reference voltage as the second data signal, and that is turned on according to the charge control signal during a second section of the polarity control signal to output one of the second reference voltage and the fourth reference voltage as the second data signal.

* * * * *